Patented Feb. 14, 1950

2,497,294

UNITED STATES PATENT OFFICE 2,497,294

INSECTICIDAL COMPOSITION

Leonard C. Cartwright, New York, N. Y., assignor to Foster D. Snell, Inc., a corporation of New York No Drawing. Application October 15, 1946, Serial No. 703,285

3 Claims. (Cl. 106—16)

This invention relates to a composition containing 2,2-bis(p-chlorophenyl) 1,1,1 trichloroethane, hereinafter referred to for convenience as DDT, adapted for use in making a film that is non-tacky, free from crystallization of the DDT, and retains for a long time the desired effectiveness as an insecticide.

The invention is particularly useful in connection with the application of an insecticidal film to furniture and will be illustrated first, therefore, by description in connection with such use.

Solutions of DDT in volatile solvents, when applied to a surface and allowed to dry, give coatings of DDT in the form of generally needle shaped crystals that at one end are attached to the surface. Such coatings unless relatively heavy show pronounced loss of insecticidal power in a short time.

I have now discovered that the period of time over which a DDT coating remains effective as an insecticide is extended by preventing crystallization of DDT upon the surface to be treated.

In attempting to make a film of the desired properties I have found that resins generally either fail to prevent crystallizing of the DDT or give a film that is tacky and remains tacky for a long time. I have also found that most solvents for DDT mar the furniture finish or, in case of application to the upholstery, mar the fabric. I have now discovered, however, a composition that gives a desirable extended period of effectiveness of the DDT, prevents its crystallization, and at the same time gives a film that becomes hard within a permissible period of time after its formation on the furniture.

Briefly stated, the invention comprises a composition of matter including DDT, a resin that is compatible with the DDT and with the hardening agent, a hardening agent for the DDT and resin film, and a volatile solvent for the DDT, resin, and hardening agent. In the preferred embodiment, the invention comprises such composition in which the resin is a coumarone resin and particularly a coumarone-indene resin, the hardening agent is a cellulose ether of which ethyl cellulose gives the best results, and the solvent is at least principally liquid hydrocarbon.

Such a composition compounded as described herein may be applied directly over furniture lacquer, for instance. The hydrocarbon solvent does not dissolve or cut the lacquer. On evaporation, the solution leaves behind a film of the DDT, resin, and hardening agent that remains free from crystallization on standing and is either non-tacky at once or becomes so after a reasonable time. Furthermore, the film retains its effectiveness as an insecticide for a much longer period of time than does DDT applied in a solution of the same concentration without the protecting resin and cellulose ether composition.

As the DDT there may be used a commercial grade, any impurities that are insoluble in the solvent to be used being filtered out and discarded during the making of the composition.

As the resin there is used one that is compatible with the insecticide and hardening agent, so that there is no separation of the three ingredients after they have been deposited together by evaporation of solvent from a solution containing them. Particularly suitable are the commercial coumarone-indene resins. Other types of resins that may be used are polyterpenes, terpene phenolics, and ester gum, of which the following are examples: polymerized ester gums, maleicized ester gum, and the rosin ester of glycerin (Reichhold Ester Gum 1200).

As the hardening agent there is used a cellulose ether of a lower $C_2$ to $C_4$ aliphatic alcohol, the ether being one which is soluble in the hydrocarbon solvents described. The cellulose ether is preferably ethyl cellulose.

In general the solvent selected must be one that is a solvent for DDT, the selected resin, and the cellulose ether in the presence of the other ingredients of the composition but a non-solvent for the base material over which the composition is to be applied. When, for instance, the composition is to be applied to lacquered furniture, then the solvent used must not be an active solvent for the lacquer film.

Among the other solvents that may be used are cleaner's naphtha and gasoline, preferably gasoline that has been fractionated to remove the high boiling end products.

The solvent used is preferably a hydrocarbon liquid or mixture of rapid evaporation rate corresponding, for instance, to about that of the solvent mixture in a pyroxylin spray or brush lacquer. When a petroleum hydrocarbon fraction is selected as the solvent, it is preferably used in conjunction with some solvent naphtha to increase the rate of solution of the cellulose ether.

As to proportions, the DDT is used in the whole composition in a concentration known to be effective in conventional solutions against the insect to be destroyed. Thus the DDT is used to advantage in the proportion of 4% to 7% or so of the whole weight of the solution applied to the furniture, although the proportion may be varied in accordance with the limits published for concentrations of DDT solutions for use in insecticides as, for instance, from about 3% to 10%. Ordinarily I use the DDT in 5% concentration.

The resin is used in amount which prevents crystallization of the DDT in the film after evaporation of the volatile solvent. Suitable proportions are 0.5 to 2.5 parts of the resin and preferably 0.75 part to 1.5 parts for 5 parts of the DDT.

The cellulose ether is used as a hardening agent in amount to overcome tackiness otherwise encountered in the film of DDT and resin. This proportion of the cellulose ether must be controlled carefully. When the proportion is above a certain amount, the product shows gradual development of crystals of DDT as the film stands after evaporation of the volatile solvent. If, on the other hand, the proportion of the cellulose ether is too low, then the film will be tacky. I find that the proportion of the cellulose ether should be within the range 0.1 part to 0.5 part and, for best results commercially, between 0.15 to 0.3 part for 5 parts of the DDT.

The solvent is used in proportion to make 100 parts of total including the solvent and the non-volatile ingredients described, proportions here and elsewhere herein being expressed as parts by weight unless otherwise stated.

When the solvent naphtha is used, its proportions should be held to a minimum to prevent objectionable solvent effect upon the finishing composition on the furniture, the proportion of the naphtha that may be used varying somewhat with the type of finish on the furniture and being subject to determination by simple and quick test to show the permissible proportion of the naphtha.

In making the composition it is convenient and desirable first to dissolve the cellulose ether in warm solvent naphtha before the resin and DDT are added, time being allowed for the swelling of the cellulose ether into a jelly-like mass before it actually dissolves. With ethyl cellulose used as the cellulose ether, for instance, the ethyl cellulose is slowly added with good agitation to high flash naphtha at a temperature of 170° to 180° F. The stirring is continued, at intervals at least, until the ethyl cellulose is first swollen and then dissolved, 30 minutes being adequate ordinarily. Then any one of the resins described above is added slowly with agitation while the temperature is still held at 170° to 180° F. and preferably at about 180° F. When the resin has dissolved, then the petroleum hydrocarbon fraction is added, the mixture again warmed, say to around 170° to 180° F., care being taken to avoid ignition of the vapors, the DDT added slowly with agitation, and the agitation continued until the DDT is dissolved.

In another method the cellulose ether and resin, on the one hand, and the DDT, on the other, are dissolved separately and the solutions so formed are then mixed.

Insoluble material remaining undissolved and representing principally impurities, if any, in the DDT is removed by filtration if necessary to give a clear solution. Thus, the warm solution made as described is clarified finally by being allowed to flow by gravity through a cloth strainer held securely over the end of a discharge pipe from the mixing kettle, the apparatus being conventional. As an alternative this solution, if turbid when first made, is allowed to stand until the undissolved material settles and the clear liquor then decanted from the undissolved material.

A solution made as described may be applied to furniture in any convenient manner as, for instance, by means of a spray gun of usual type, operating under air pressure, or by a hand brush, the amount of solution applied upon a surface being made adequate to give complete coverage with the solution.

Furniture so treated retains its insecticidal properties for several months, the total life of the material being still under determination with no evidence to date of substantial depreciation in the effectiveness.

The invention will be further illustrated by description in connection with the following specific examples of the practice of it.

*Example 1*

Ethyl cellulose (10 cp.) 1.3 pounds were dissolved in 195 pounds of warm solvent naphtha. Coumarone-indene resin 6.5 pounds were added, and then DDT 33 pounds were dissolved in this solution. Finally, petroleum naphtha distilling within the range 240°–325° F. 415 pounds were added and the whole warmed and mixed until solution was complete.

The product is a clear, slightly yellow solution. When sprayed upon previously lacquered furniture, the composition dries to a clear transparent non-tacky and uniform film without injury to the original finish.

*Example 2*

In making composition of the following formulas, the ethyl cellulose and coumarone-indene resin were dissolved in the warm solvent naphtha. Separately the DDT was dissolved in the cleaners' naphtha. The two solutions so made were then mixed together.

| Ingredient | Weight in Pounds | |
|---|---|---|
| | Formula A | Formula B |
| Coumarone-indene resin | 5.2 | 10 |
| Ethyl cellulose (10 cp.) | 1.3 | 2 |
| Solvent naphtha | 195 | 293 |
| DDT | 33 | 33 |
| Liquid petroleum hydrocarbon | 416 | 313 |
| Total | 650.5 | 651 |

Both formulas A and B as first made are clear slightly yellow solutions.

Formula A gives a film that is somewhat harder than that of Example 1 but, when sprayed in an atmosphere that is dusty and then allowed to evaporate, gives a film in which some crystallization develops because of the low proportion of the resin. The composition is satisfactory for use in carefully conditioned air.

Formula B, because of the high proportion of the resin, gives a film that is free from crystallization of DDT but is slightly tacky until the film is thoroughly dried.

*Example 3*

The same order of mixing is used as under Example 2 except that the proportions are varied and different commercial grades of the resin and solvents are substituted.

| Ingredient | Weight in Pounds | |
|---|---|---|
| | Formula C | Formula D |
| Coumarone-indene resin | 6.5 | 6.5 |
| Ethyl cellulose (10 cp.) | 1.3 | 1.3 |
| Solvent naptha | 195 | 376 |
| DDT | 33 | 33 |
| Liquid petroleum fraction | 415 | 234 |
| Total | 650.8 | 650.8 |

Both Formulas C and D give clear, slightly yellow solutions that are initially somewhat tacky but from which the tackiness disappears on thorough drying, that is, after several days. The films of both C and D are free from crystals.

Example 4

The procedure of Example 3 is followed except that 6.5 parts of polyterpene resin are substituted for an equal weight of the coumarone-indene resin.

The solution so made with the polyterpene resin shows appreciable but slow crystallization in the film. The solution is therefore not entirely satisfactory but may be used in certain limited fields where crystallization and slow loss of effectiveness as an insecticide are not objectionable.

In the above examples, other cellulose ethers may be substituted for the ethyl cellulose on a pound for pound basis, as, for instance, a higher alkyl ether of cellulose such as propyl or butyl ether containing at least 3 carbons in the alkyl.

When it is permissible to vary the solvent from the hydrocarbon medium described above to a more active solvent for cellulose derivatives, then other toughening agents than cellulose ethers may be used. When, for example, my insecticidal finishing composition is to be applied over fabric or over wood that has not been previously lacquered or varnished, I may use more active solvents, say the volatile esters and ketones or mixtures such as the solvent media commonly employed in pyroxylin lacquer compositions. In that event I may substitute the ethyl cellulose on an equal weight basis by another cellulose derivative, by cellulose acetate or nitrate of the lacquer grade, for instance.

It is essential that the hardening agent selected be water insoluble but soluble in the organic liquids described that are solvents for the insecticide and resin.

Also other commercial coumarone-indene resin may be substituted for that shown and other hydrocarbon solvents for those used in the examples. Such substitutions are to be made on an equal weight basis.

The compositions described may be used on other objects than finished furniture. Thus, they may be used on fabrics including the upholstery fabric of furniture, carpets, clothes bags, or the like. When so used the composition renders the fabric mothproof for a long and indefinite period of time.

It will be understood also that it is intended to cover all changes and modifications of the examples of the invention herein chosen for the purpose of illustration which do not constitute departures from the spirit and scope of the invention.

What is claimed is:

1. A liquid composition suitable for use in forming a hard non-tacky insecticidal film comprising 2,2-bis(p-chlorophenyl) 1,1,1-trichlorethane serving as the insecticide, a water insoluble cellulose ether of an aliphatic alcohol containing 2 to 4 carbon atoms to the molecule serving as hardening agent, a coumarone-indene resin, and a volatile solvent medium for the insecticide, hardening agent and resin, proportions by weight of the non-volatile ingredients being 0.5 part to 2.5 parts of the resin, 0.1 to 0.5 part of the cellulose ether and 5 parts of the insecticide.

2. A liquid composition suitable for use in forming a hard non-tacky insecticidal film comprising 2,2,-bis(p-chlorophenyl) 1,1,1-trichlorethane serving as the insecticide, a water insoluble cellulose ether of an aliphatic alcohol containing 2 to 4 carbon atoms to the molecule serving as hardening agent, a resin selected from the group consisting of coumarine-indene resin, terpene resin, ester gum, polymerized ester gum and maleicized ester gum, and a volatile solvent medium for the insecticide, hardening agent and resin, proportions by weight of the non-volatile ingredients being 0.5 part to 2.5 parts of the resin, 0.1 to 0.5 part of the cellulose ether and 5 parts of the insecticide.

3. A composition as described in claim 2, the said resin being ester gum.

LEONARD C. CARTWRIGHT.

REFERENCES CITED

The following references are of record in the file of this patent:

UNITED STATES PATENTS

| Number | Name | Date |
|---|---|---|
| 2,349,571 | Cummins | May 23, 1944 |

OTHER REFERENCES

"Use of DDT in Paint," by L. L. Carrick, 5 pages, October 31, 1945, issue of American Paint Journal Convention-at-Home Daily.

Article in Paint Manufacturer, December 1944, vol. XIV, 12 pages, 353, 354.